3,151,144
ARYLAMINES CONTAINING ONE OR MORE THIOSULFURIC ACID GROUPS AND PROCESS OF PREPARING THEM

Kurt Schimmelschmidt, Frankfurt am Main, and Hermann Hoffmann, Bad Soden, Taunus, Germany, assignors to Farbwerke Hoechst Aktiengesellschaft vormals Meister Lucius & Brüning, Frankfurt am Main, Germany, a corporation of Germany
No Drawing. Filed Feb. 23, 1960, Ser. No. 10,052
Claims priority, application Germany, Feb. 25, 1959,
F 27,794
5 Claims. (Cl. 260—453)

The present invention relates to arylamines containing one or more thiosulfuric acid groups and process of preparing them.

Aromatic amino compounds containing thiosulfuric acid groups in the aromatic nucleus have hitherto been known in the ortho series only. Thus, for example, 2-amino-5-dimethylamino-phenyl-thiosulfuric acid (A. 251, 1 (1889)) has been prepared by reacting 4-dimethylaminoaniline with sodium thiosulfate in the presence of oxidizing agents, and 2-aminophenyl-thiosulfuric acid (German Patent 120,504) by reacting 2,2'-diamino-diphenyl-disulfide with sulfurous acid. An application of the last-mentioned reaction to the 4,4'-diamino-diphenyl-disulfide fails to work (J. Chem. Soc., London, 1930, 2691). The arylamines known from the literature which possess a thiosulfuric acid group at the aromatic nucleus all originate from the ortho series. Contrary to the arylamines having a thiosulfuric acid group in meta or para position which may always be converted into the desired diazonium compounds when they are diazotized, part of the representatives of the ortho series, for instance the compound known from the literature, is converted during the diazotation by ring closure into other undesired compounds such for example as diazosulfides. The literature actually describes salts of nitrophenyl-thiosulfuric acids (J. Org. Chem., volume 20, page 475 (1955), U. K. Patent 751,889), but the corresponding aminophenyl-thiosulfuric acids are unknown. It would appear obvious to reduce the nitro group of these compounds but this is apparently rather difficult.

Now we have found that aromatic amino-thiosulfuric acids can be obtained in good yields by reducing salts, preferably alkali or ammonium salts, of aromatic nitro compounds containing thiosulfuric acid groups wherein the thiosulfuric acid groups are bound by a bridge member, to the aromatic nucleus in the presence of iron and ferrous ions in a neutral or almost neutral aqueous medium, for instance at a pH from about 5 to 7. This result was surprising in so far as the thiosulfuric acid group, as is known, is very easily destroyed by hydrolysis or reduction.

It has proved especially favorable to use as reducing agent iron powder in an aqueous suspension in the presence of ferrous sulfate. During the reduction of the sodium salts of nitroaryl-thiosulfuric acids it may be suitable to add ammonium chloride or magnesium salts. At boiling temperature, the reduction proceeds very rapidly without the formation of by-products. The process can also be carried out at lower temperatures, for instance within the range of about 80 to 100° C., whereby, however, longer reduction periods are necessary. The iron powder is suitably used in excess with regard to the nitroaryl compound used. The amount of ferrous sulfate calculated upon the nitroaryl compound to be reduced may vary within rather wide limits. It is suitable, however, to use the ferrous sulfate in an amount of about 0.02 to 0.2 mol calculated upon 1 mol of nitroaryl compound to be reduced.

The aromatic nitro compounds containing thiosulfuric acid groups which are obtained by known processes and used as starting material belong to the benzene series and may be substituted, as desired, by halogen atoms, alkyl or alkoxy groups.

The thiosulfuric acid groups may be bound to the aromatic nucleus via hydrocarbon bridges interrupted by one or more hetero atoms such for example as in the salts obtained by reacting (German Patent 869,067) nitroaryl-sulfochlorides with aminoalkyl-thiosulfuric acid, such for example as β-amino-ethyl-thiosulfuric acid. Such reaction products are, for example, the salts of compounds of the formula

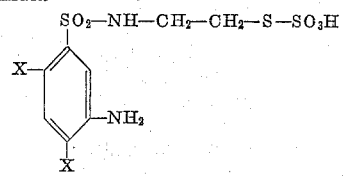

in which one X is hydrogen and the other X is hydrogen, halogen or alkyl.

The reduction solutions freed from iron and iron oxides by known methods may be worked up according to different methods. If the starting material contains a nitro group and a thiosulfuric acid group, the aminoaryl-thiosulfuric acids formed may be isolated in the form of salts by concentration and/or acidification while concentrating and/or salting out and/or acidifying may be appropriate if the ratio of thiosulfuric acid groups:nitro groups amounts to 2:1. Most of the aromatic amino-thiosulfuric acids which may be prepared by the process of the present invention, are obtained in the form of well crystallizing colorless substances which are easily soluble in cold dilute alkalis.

The new compounds prepared according to the process of the present invention contain reactive thiosulfuric acid groups, and therefore constitute valuable intermediate products for many industrial purposes, particularly for the preparation of textile auxiliaries or dyestuffs.

The following examples serve to illustrate the invention but they are not intended to limit it thereto, the parts being by weight unless stated otherwise.

EXAMPLE 1

25 parts of the ammonium salt of 3-nitrophenyl-thiosulfuric acid are introduced into a boiling mixture of 28 parts of iron powder, 2 parts of ferrous sulfate and 200 parts by volume of water in a manner such that the reduction solution continues boiling. The reduction takes place immediately. After completion of the reduction, the reaction mixture is cooled down, rendered weakly ammoniacal, filtered off with suction and concentrated by evaporation under reduced pressure. The crystalline residue is taken up with 80 parts by volume of isopropanol and filtered off. There are obtained 16 parts of 3-aminophenyl-thiosulfuric acid melting at a temperature within the range of 233 to 236° C. The substance is easily soluble in water but only difficultly soluble in other usual solvents.

EXAMPLE 2

169 parts of the sodium salt of 2,4-dichloro-5-nitro-benzyl-thiosulfuric acid are introduced into a boiling mixture of 140 parts of iron powder, 10 parts of ferrous sulfate and 1000 parts by volume of water in a manner such that the reduction solution continues boiling without any heat supply from the outside. The hot mixture is rendered alkaline with ammonia and filtered off from the iron. The filtrate is adjusted with hydrochloric acid to a pH of 1 whereby the reaction product immediately crystallizes out. There are obtained 98 parts of 2,4-dichloro-5-aminobenzyl-thiosulfuric acid melting at 247° C.

EXAMPLE 3

190 parts of the sodium salt of 3-nitrobenzene-sulfonyl-methyl-β-amino-ethyl-thiosulfuric acid are added to a boiling mixture of 280 parts of iron powder, 20 parts of ferrous sulfate and 1000 parts by volume of water in a manner such that the solution continues boiling. The mixture is then cooled, rendered alkaline with ammonia, filtered off from the iron oxides and acidified whereby the reaction product crystallizes. There are obtained 105 grams of 3-aminobenzene-sulfonylmethyl-β-amino-ethyl-thiosulfuric acid melting at a temperature within the range of 234 to 235° C.

EXAMPLE 4

263 parts of the disodium salt of 3-nitro-benzenesulfonyl-imino-di-β,β'-ethyl-thiosulfuric acid are introduced into a boiling mixture of 280 parts of iron powder, 20 parts of ferrous sulfate and 1000 parts by volume of water in a manner such that the reaction solution continues boiling. The mixture is then immediately cooled, rendered alkaline with ammonia and filtered off. The filtrate is acidified with hydrochloric acid and concentrated by evaporation under reduced pressure whereby the 3-aminobenzene-sulfonyl-imino-di-β,β'-ethyl-thiosulfuric acid is obtained in the form of a crystalline monosodium salt.

EXAMPLE 5

A solution of 270 parts of the sodium salt of 3-nitro-benzyl-thiosulfuric acid in 800 parts by volume of water is run into a boiling mixture of 560 parts of iron powder, 40 parts of sodium chloride, 10 parts of ferrous sulfate and 200 parts by volume of water in a manner such that the mixture continues boiling. The mixture is rendered weakly alkaline with ammonia, clarified, neutralized, concentrated under reduced pressure to about 500 parts by volume, and the reduction product is precipitated by the addition of hydrochloric acid. There are obtained 160 parts of 3-aminobenzylthiosulfuric acid melting at a temperature within the range of 224 to 225° C.

The aminoaryl-thiosulfuric acids listed in the following table are prepared in an analogous manner.

Table

| | Melting point in ° C. |
|---|---|
| 3-amino-4-methoxybenzyl-thiosulfuric acid | 218. |
| 5-aminonaphthyl-(1)-methyl-thiosulfuric acid | 265 to 266. |
| 4-aminophenoxy-β-ethyl-thiosulfuric acid | 253 to 256. |
| 4-aminobenzoylamino-β-ethyl-thiosulfuric acid | 216 to 217. |
| 3-aminobenzene-sulfonylamino-β-ethyl-thiosulfuric acid | 239 to 241. |
| 3-amino-6-chlorobenzene-sulfonylmethyl-amino-β-ethyl-thiosulfuric acid | 208. |
| 3-amino-4-chlorobenzene-sulfonyl-amino-β-ethyl-thiosulfuric acid | 231 to 233. |
| 4-amino-diphenyl-4'-carbonylamino-β-ethyl-thiosulfuric acid | 283 to 284 with decomposition. |
| 4-aminobenzene-sulfonylamino-β-ethyl-thiosulfuric acid | 225 to 226. |
| 2-aminobenzyl-thiosulfuric acid | 197 to 198. |
| 3-amino-4-methyl-benzenesulfonyl-amino-β-ethyl-thiosulfuric acid | 253 to 254. |
| 3-amino-6-methyl-benzenesulfonyl-amino-β-ethyl-thiosulfuric acid | 234 to 235 with decomposition. |

We claim:

1. Arylamines of the formula

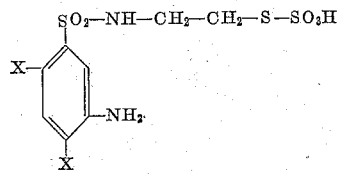

wherein one X represents a hydrogen atom and the other X a member of the group consisting of hydrogen, methyl and chlorine.

2. The arylamine of the following formula

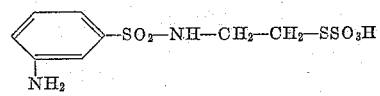

3. The arylamine of the formula

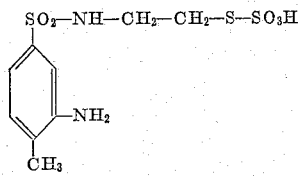

4. The arylamine of the formula

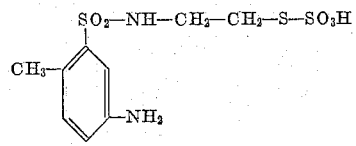

5. The arylamine of the formula

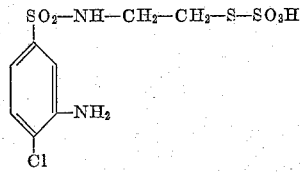

References Cited in the file of this patent

UNITED STATES PATENTS

| 2,245,971 | Felix et al. | June 17, 1941 |
| 2,283,326 | Felix et al. | May 19, 1942 |
| 2,424,493 | Muller | July 22, 1947 |
| 2,706,200 | Lecher et al. | Apr. 12, 1955 |

OTHER REFERENCES

Wegmann: "Textil-Praxis," October 1958, pages 1056–1061 (6 pages).

Venkataraman: "The Chemistry of Synthetic Dyes," vol. 1, pages 79–82 (1952) (4 pages), Academic Press, Inc., New York.